UNITED STATES PATENT OFFICE.

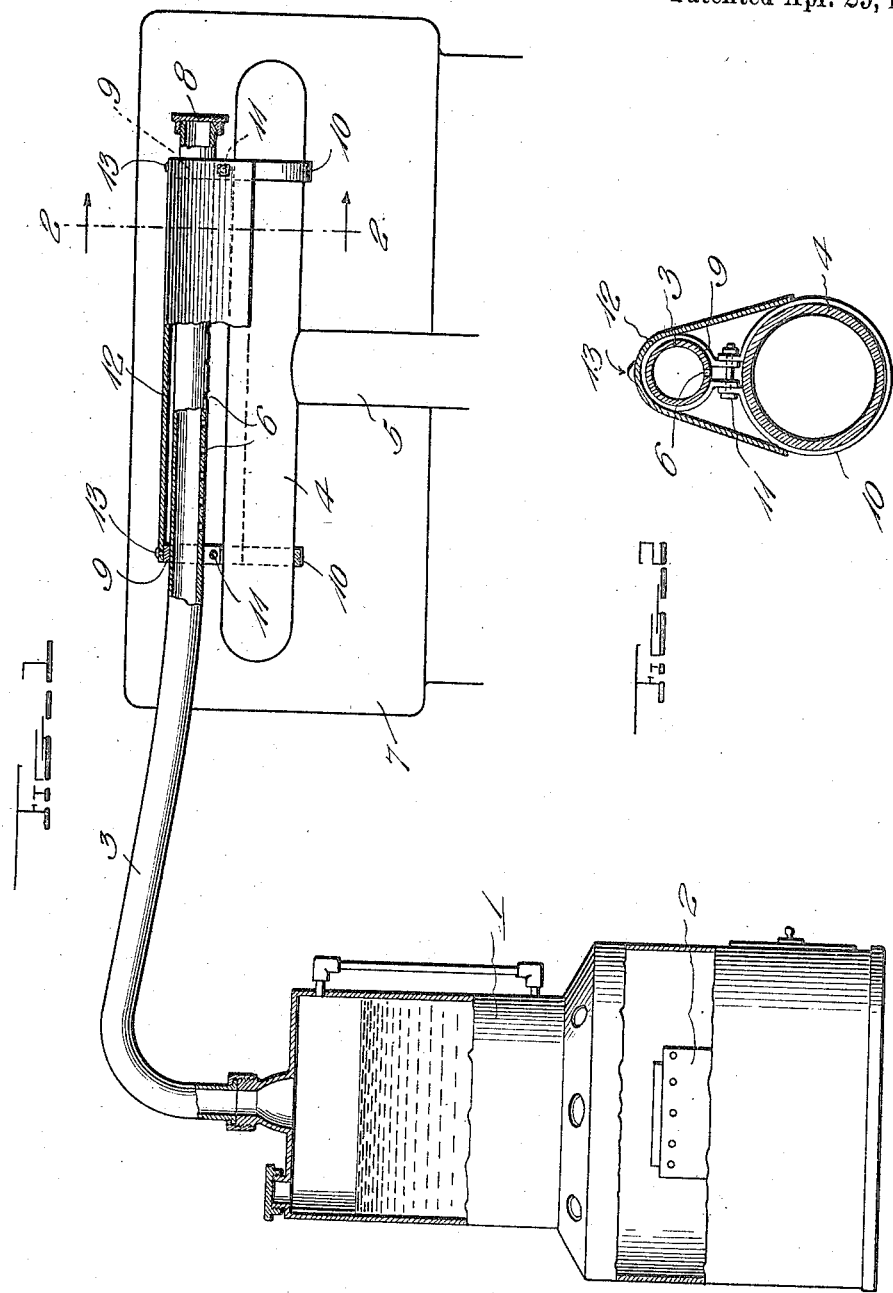

SAMUEL G. FOSTER AND PERCY G. FOSTER, OF WESTFIELD, NEW JERSEY.

MANIFOLD-HEATER.

1,302,349.  Specification of Letters Patent.  Patented Apr. 29, 1919.

Application filed December 17, 1917. Serial No. 207,558.

*To all whom it may concern:*

Be it known that we, SAMUEL G. FOSTER and PERCY G. FOSTER, citizens of the United States, residing at Westfield, in the county of Union and State of New Jersey, have invented certain new and useful Improvements in Manifold-Heaters; and we do declare the following to be a full, clear, and exact description of the invention, such as will enable others skilled in the art to which it appertains to make and use the same.

Our invention has for its object to provide a simple and inexpensive, yet a highly efficient device for heating the intake manifold of automobile motors to insure easy starting in cold weather; and with this general object in view, the invention resides in the unique construction and combination of parts herein described and claimed.

In the accompanying drawing:

Figure 1 is a side elevation partly in section; and

Fig. 2 is a transverse section on the plane of the line 2—2 of Fig. 1.

In the drawing, above briefly described, the numeral 1 designates a small water boiler preferably of approximately one gill capacity, any suitable means such as a burner 2 or an electric heater being employed for heating the water in said boiler and converting it into steam. The boiler and its heating means may be located at any suitable point on the car.

Leading from the upper end of boiler 1 is a tube 3 of any suitable size, said tube extending parallel with and in close proximity to the horizontal portion 4 of the intake manifold 5, and having perforations 6 for spraying the steam from the boiler onto said manifold to quickly heat the latter so that easy vaporization of the fuel will take place as it passes to the motor 7. The tube 3 is by preference located above the manifold with its perforations in its lower side as seen in Fig. 1, and the free end of said tube may be closed by any suitable means such as a cap 8.

For securing the tube 3 to the manifold, a pair of C clips 9 are passed around said tube and a second pair of such clips 10 extend around the portion 4 of said manifold, the ends of the clips 9 and 10 being secured together by bolts 11 which pass through said ends and serve to draw the clips tightly around the tube and manifold. This type of securing means is preferred but other clamps could well be used.

To confine the heat around the manifold 5, an arched shield 12 passes over the perforated portion of tube 3 and straddles the portion 4 of the manifold, and as a simple yet efficient manner of attaching this shield, we have shown rivets 13 securing it to the upper clips 9. These clips thus perform the two-fold function of securing the shield 12 and the steam tube 3 in place.

In operation, the boiler 1 is filled with water and the heating means is brought into play, the result being that almost instantaneously, steam will be generated and discharged from the perforations 6 onto the manifold, thus quickly heating the latter and insuring easy starting.

Since excellent results are obtained from the arrangement shown and described, this arrangement is preferably employed, but within the scope of the invention as claimed, numerous minor changes may well be made. Also it is not necessary in all cases to locate the heater as shown, as different makes of cars may require other arrangements.

We claim:

1. A manifold heater comprising a tube adjacent the manifold and having means for spraying steam onto the same, and a steam generator from which said tube leads.

2. A manifold heater, comprising a tube parallel with and extending along the upper side of the manifold, said tube having perforations for spraying steam onto said manifold, and a steam generator from which said tube leads.

3. A structure as specified in claim 2, and an arched shield extending over said tube and the parallel portion of the manifold to confine the heat around the latter.

4. A structure as specified in claim 2, an arched shield extending over said tube and the parallel portion of the manifold, and clamps substantially encompassing said tube for securing it to the manifold, said shield being secured to said clamps.

In testimony whereof we have hereunto set our hands in the presence of two subscribing witnesses.

SAMUEL G. FOSTER.
PERCY G. FOSTER.

Witnesses:
JOSEPH F. WALL,
HENRY J. GOODENOUGH.

Copies of this patent may be obtained for five cents each, by addressing the "Commissioner of Patents, Washington, D. C."